(12) United States Patent
Yamane et al.

(10) Patent No.: US 6,614,648 B2
(45) Date of Patent: Sep. 2, 2003

(54) BUS LINE CONDUCTOR CONTAINER AND GAS INSULATED SWITCHGEAR DEVICE USING THE SAME

(75) Inventors: Yuuichirou Yamane, Hitachi (JP); Kenji Tsuchiya, Hitachi (JP); Youichirou Taniguchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/082,061

(22) Filed: Feb. 26, 2002

(65) Prior Publication Data

US 2003/0117769 A1 Jun. 26, 2003

(30) Foreign Application Priority Data

Dec. 26, 2001 (JP) ........................................ 2001-393046

(51) Int. Cl.$^7$ ................................................. H02B 1/20
(52) U.S. Cl. ........................ 361/612; 361/618; 361/619; 361/604; 174/176 F
(58) Field of Search ................................ 361/612, 613, 361/619; 174/176 F; 218/11, 37, 44, 71, 55

(56) References Cited

U.S. PATENT DOCUMENTS 4,774,628 A * 9/1988 Diaferia et al. ............. 361/621
4,779,197 A * 10/1988 Hama et al. ................. 361/612
4,821,140 A * 4/1989 Takeuchi et al. ............. 361/612
4,967,307 A * 10/1990 Itou et al. .................... 361/618
5,177,664 A * 1/1993 Tsuchiya et al. ............. 361/612

FOREIGN PATENT DOCUMENTS

JP   11-69581   3/1999

* cited by examiner

*Primary Examiner*—Boris Chervinsky
(74) *Attorney, Agent, or Firm*—Mattingly, Stanger & Malur, P.C.

(57) ABSTRACT

In a gas insulated switchgear device, a phase transposing unit for bus line conductors is provided in a bus line tank without providing a separate bus line extending unit. A bus line container includes a plurality of tanks connected in a straight line shape in which three phase main bus line conductors are accommodated. The container also includes connecting ports through which conductors can be connected. Terminal portions near the connecting portions of respective phases of the three phase bus line conductors in at least one of the tanks are extended so as to match an arrangement position of three phase bus line conductors in an adjacent tank.

14 Claims, 3 Drawing Sheets

BUS LINE CONDUCTOR CONTAINER AND GAS INSULATED SWITCHGEAR DEVICE USING THE SAME

BACKGROUND OF THE INVENTION

1. Field of the Invention

The present invention relates to a bus line conductor and a gas insulated switchgear device using the same, and more specifically relates to a bus line conductor which is suitable to be formed by accommodating three phase bus line conductors in a tank filled with insulation gas having high arc quenching property such as SF6 gas and a gas insulated switchgear device using the same.

2. Conventional Art

Conventionally, a gas insulated switchgear device (hereinbelow will be referred to as GIS) provided with a bus line container (tank) is, for example, arranged between a three phase high voltage source and an atmospheric power transmission line in a substations. It functions to interrupt current when detecting an abnormal voltage such as by a lightning surge. Also, it is roughly constituted by a bushing for receiving power from the three phase high voltage source and the gas insulated bus line container accommodating three phase bus line conductors for power distributing from the bushing to a gas insulated circuit breaker (hereinbelow will be referred to as GCB).

In the above to referenced conventional art, when wiring conductors from the bushing into the bus line container and when wiring conductors from the bus line container to the GCB, since the three phase bus lines in the adjacent bus line containers are arranged differently, it must be considered as to how to connect these conductors.

In the conventional GIS, for example, as disclosed in JPA-11-69581 (1999), the above problem was countermeasured by such a manner that a separate phase transposing unit is provided between bus line containers in which respective three phase bus line conductors are accommodated. The phases of the bus lines are transposed in the separate phase transposing unit and are connected to each other.

However, with the above countermeasure, when transposing the phases in the adjacent bus line containers, since the bus line phases are transposed through provision of the separate transposing unit, a total length of the GIS is increased which resultantly increases an entire area of the GIS and an installation area therefor.

SUMMARY OF THE INVENTION

An object of the present invention is to provide a compact bus line conductor container and a gas insulated switchgear device using the same which, even if three phase bus line conductors within adjacent bus line conductor containers are arranged differently, prevents increasing the total length of the device as well as prevents increase of an entire area therefor beyond its necessity, and prevents installation area enlargement.

In order to achieve the above object, the bus line conductor container and insulated switchgear device according to the present invention are as defined in the claims.

DETAILED DESCRIPTION OF THE PREFERRED EMBODIMENTS

Hereinbelow, an embodiment of the present invention will be explained with reference to the drawings.

Figure 1:
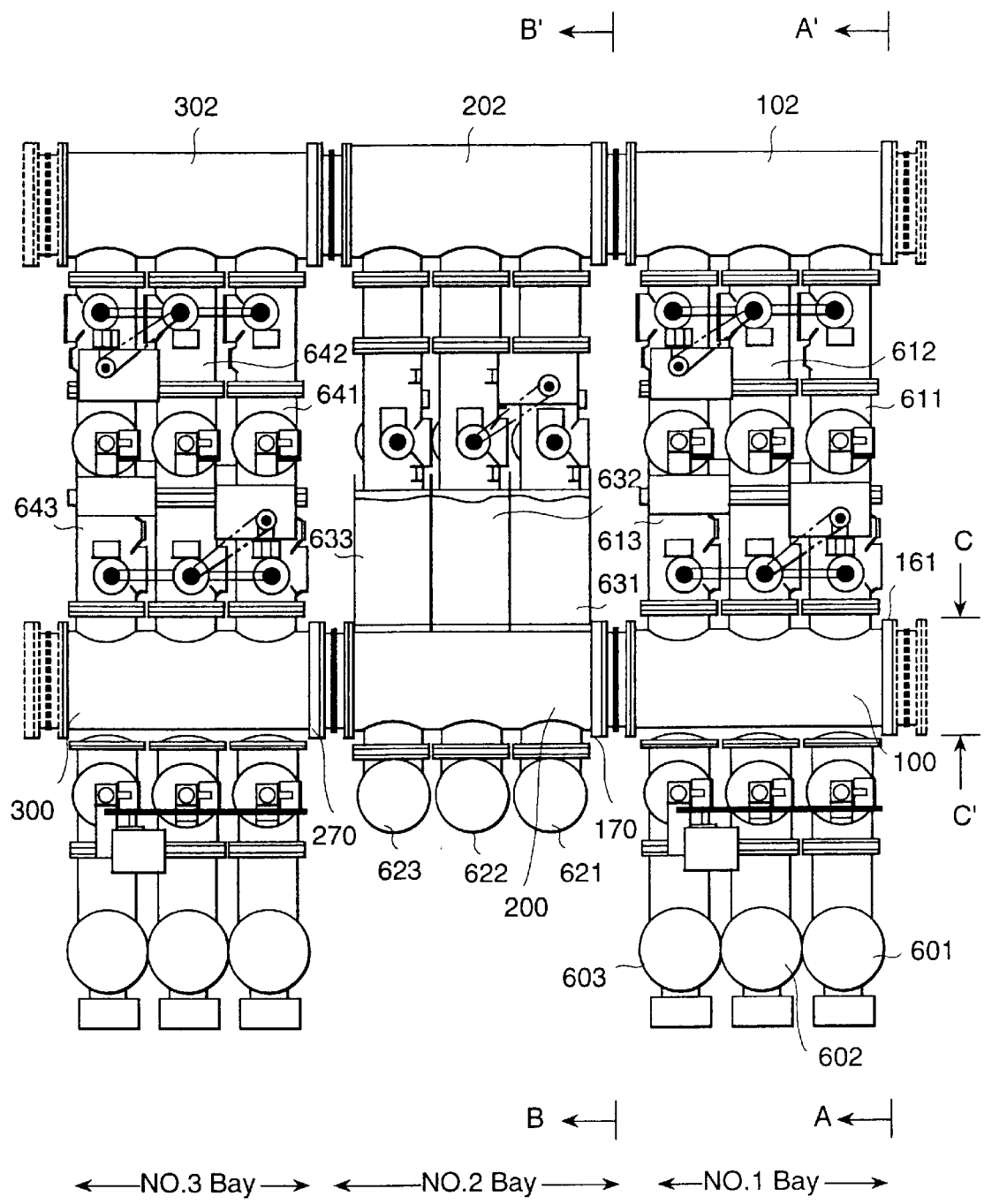
FIG. 1 is a top plane view of a gas insulated switchgear device representing an embodiment of the present invention.
Figure 2:
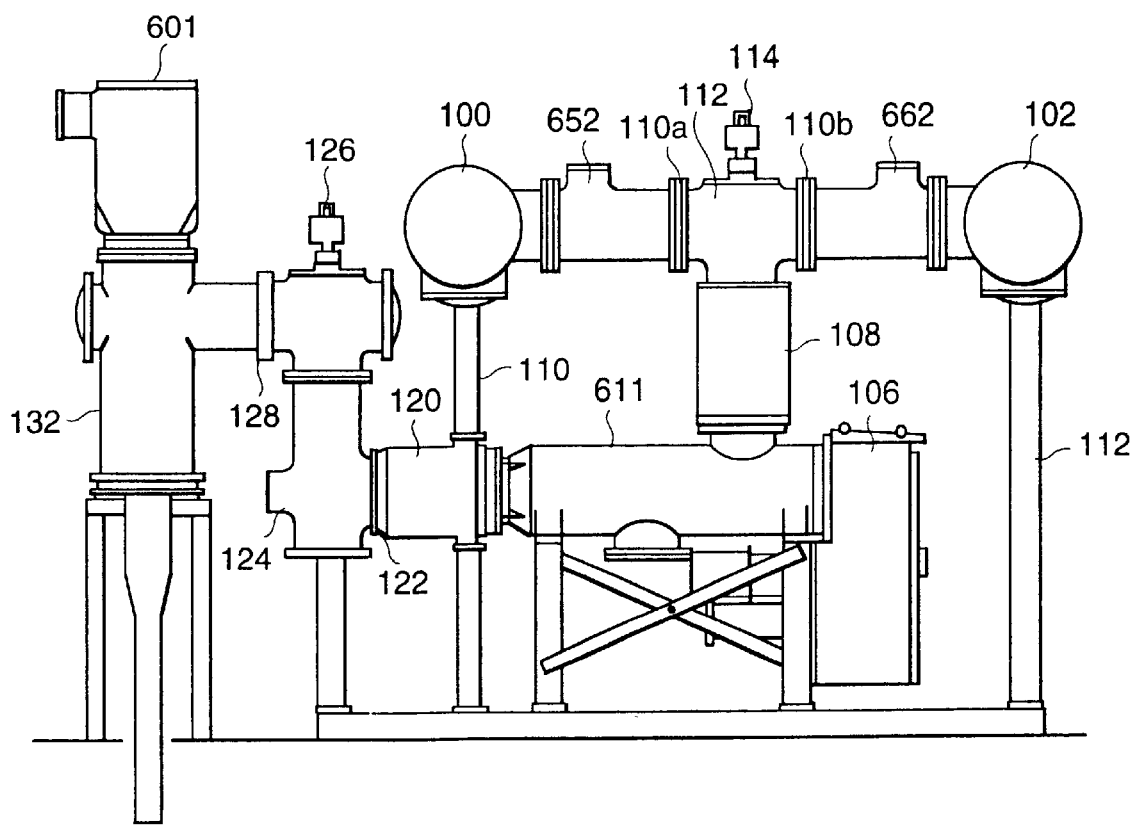
FIG. 2 is a side view of the gas insulated switchgear device representing the embodiment of the present invention.
Figure 3:
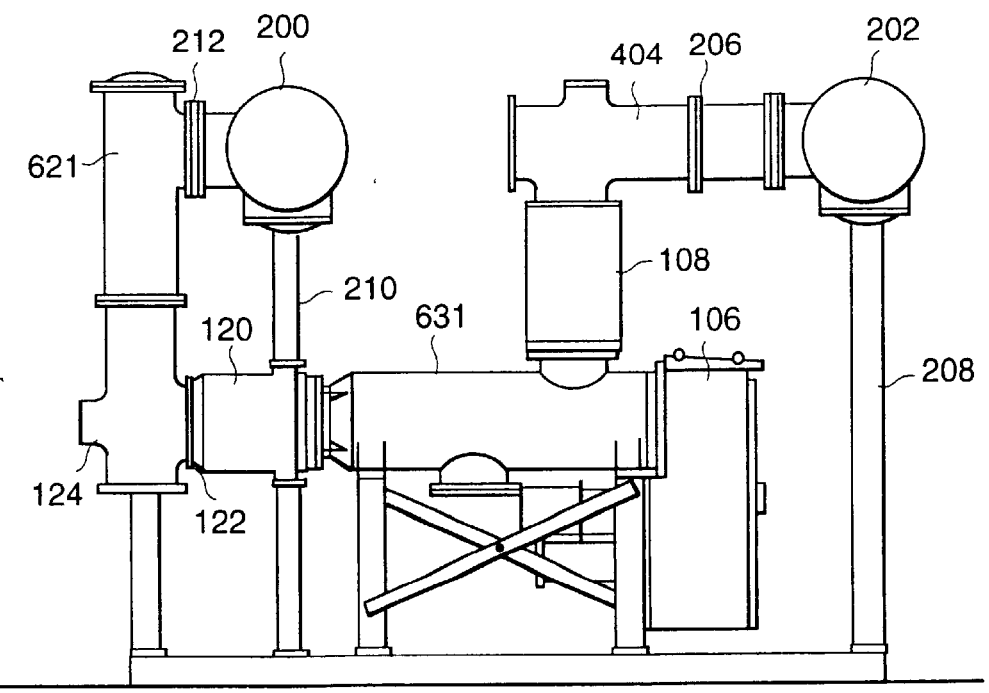
FIG. 3 is another side view of the gas insulated switchgear device representing the embodiment of the present invention.

FIGS. 1 through 3 show an embodiment of a GIS of the present invention.

As shown in the drawings, the GIS of the present embodiment is provided with a main bus line conductor containers 102, 202 and 302 in which first three phase inclusive bus line conductors are accommodated, and another main bus line conductor containers 100, 200 and 300 in which second three phase inclusive bus line conductors are accommodated, and in these containers $SF_6$ gas is filled in a sealed manner so as to ensure insulation.

The respective phase bus line conductors in the first and second three phase bus lines are constituted to be connected to corresponding circuit breaker units respectively provided for No.1 bay, No.2 bay and No.3 bay which will be explained later. The respective phase bus line conductors in the first and second three phase bus lines constitute together with the circuit breaker units No.1 through No.3 bay units for every bay of No.1 through No.3.

No.1 bay unit is constituted by first through third bus line conductors accommodated in the main bus line container 102 and first through third bus line conductors accommodated in the main bus line container 100, and these bus line conductors are connected to cable heads for every phase via the gas circuit breakers accommodated in the respective circuit breaker unit 611, 612 and 613 so as to permit opening and closing thereof.

Further, in the like manner, in No.2 bay unit, the first through third three phase bus line conductors accommodated in the first main bus line container 202 are connected to the first through third three phase bus line conductors accommodated in the second main bus line container 200 via the circuit breaker units 631, 632 and 633 so as to permits opening and closing thereof.

Still further, in the like manner, in No.3 bay unit, the respective first through third three phase bus line conductors accommodated in the first and second main bus line containers 302 and 300 are connected to cable heads for every phases via gas circuit breakers accommodated in the circuit breaker units 641, 642 and 643 so as to permit opening and closing thereof.

The main bus line containers 100 and 102 provided for the first bay and accommodating the first and second three phase bus line conductors can be connected, if required, to another bay unit not shown at the opposite side from one where the second bay unit is connected, further, in the same way, the main bus line containers 300 and 302 provided for the third bay unit and accommodating the first and second three phase bus line conductors can be connected to another bay unit not shown at the opposite side from one where the second bay unit is connected so as to constitute a GIS.

FIG. 2 shows a cross sectional view taken along line A–A' of the first bay unit in FIG. 1 which is seen in the horizontal direction from the installation plane of the device and shows a structure of a circuit breaker unit for one phase filled with SF6 gas. The present bay unit is constituted to connect the first or second three phase bus line conductors to the respective cable heads via the gas circuit breakers accommodated in the circuit breaker units 611, 612 and 613.

In the first bay unit, the circuit breaker unit 611 is disposed at the bottom side thereof in horizontal direction and an operating unit 106 for driving a movable conductor in the circuit breaking unit 611 is arranged at the right side of the circuit 611. Above the circuit breaking unit 611 a current transformer unit 108 and a bus line connecting conductor 112 are disposed. The bus line connecting conductor 112 and a conductor connected to the circuit breaker unit 611 are electrically connected via a tulip shaped contact. The bus line connecting conductor 112 is formed in a cross shape and the right and left side thereof are supported and secured by insulator spacers 100a and 110b. Above the bus line connecting conductor 112 a grounding device 114 is connected via a flange. At the respective opposite sides of the insulator spacers 110a and 110b supporting and securing the bus line connecting conductor 112 main bus line disconnecting switch units 652 and 662 are disposed. Detachable supporting posts 110 and 112 are respectively provided between the main bus line containers 100 and 102 and the installation plane and are permitted to support the main bus line containers 100 and 102 and the main bus line disconnecting switch units 652 and 662, when disassembling the circuit breaker unit 611 at the time of an accident thereof.

Further, in the present embodiment, the main bus line containers 100 and 102 are constituted so as to include three phases, thus in the main bus line container 100 main bus line conductors 152, 154 and 156 are arranged in an equilateral triangle, and in the main bus line container 102 main bus line conductors 152, 154 and 156 are likely arranged in an equilateral triangle which will be explained later, and from the main bus line containers 100 and 102 the main bus line conductors for the respective phases are led out in the direction facing each other.

Still further, at the left side of the circuit breaker unit 611 a current transformer unit 120 is connected via a flange. At the current transformer 120 a vertical type line side disconnecting switch unit 124 is disposed via an insulator spacer 122. The grounding device 114, the current transformer unit 108, the circuit beaker unit 611 and the current transformer unit 611 are sectioned by the insulator spacers 110a, 110b and 122, and are arranged individual gas sections in which $SF_6$ gas is filled.

Through the above explained structure, the insulator spacer 122 can be disposed in a position which is remote from the circuit breaker section as much as possible, thereby, a possible influence of the circuit breaker section onto the insulator spacer 122 at the time when the circuit breaker unit 611 interrupts an accident current can be limited, and further the amount of gas in the circuit breaking section can be increased to thereby enhance circuit breaking performance.

At the line side disconnecting switch unit 124 another grounding switch 126 is provided. Within the disconnecting switching unit 124 a stationary electrode and a movable electrode constituting the disconnecting section are provided. At the left side of the line side disconnecting switch 124 a potential transformer unit 601 is connected upward via an insulator spacer 128 and a conductor, and the conductor extended downward is connected to a cable head 132.

FIG. 3 is a side view of the second bay unit taken along line B–B' in FIG. 1 and seen the same in the horizontal direction from the installation plane of the device, and shows a structure of the circuit breaker unit accommodating one phase conductor and being filled with SF6 gas. The present bay unit is constituted by connecting the first and second three phase bus lines via respective gas circuit breakers.

As shown in FIG. 3, at the bottom side thereof, a circuit breaker unit 631 is disposed in horizontal direction, and an operating unit 106 which drives a movable contact of the circuit breaking unit 631 is arranged at the right side of the circuit breaking unit 631. Above the circuit breaking unit 631 a current transformer 108 and a bus line connecting conductor 404 are provided via spacers. The bus line connecting conductor 404 and the circuit breaking unit 631 are electrically connected via a tulip shaped contact. The right side of the bus line connecting conductor 404 is electrically connected to the main bus line container 202 via an insulator spacer 206. A detachable supporting post 208 is provided between the main bus line container 202 and the installation plane thereof, thereby, even when disassembling the circuit breaking unit 631, the main bus line container 202 is supported by the supporting, post 208. Further, the insulator spacer 206 is disposed in vertical direction with respect to the installation plane, a possible collection of metallic foreign matters on the surface of the insulator spacer 206 can be prevented which enhances reliability with respect to insulation.

At the left side of the circuit breaker unit 631 a vertical type disconnecting switch 124 is arranged via an insulator spacer 122 and is connected to the main bus line container 200 via a connecting conductor 621. A connecting conductor led out in horizontal direction from a connection port of the main bus line container 200 is connected to the connecting conductor 621 via an insulator spacer 212. Since the main bus line containers 200 and 202 are arranged on a same horizontal plane, the distance between the connection ports of the main bus line containers 200 and 202 can be shortened. For the main bus line container 200, since a detachable supporting post 210 is provided, even when disassembling the circuit breaker unit 631, the main bus line container 200 can be supported by this supporting post 210.

Figure 4:
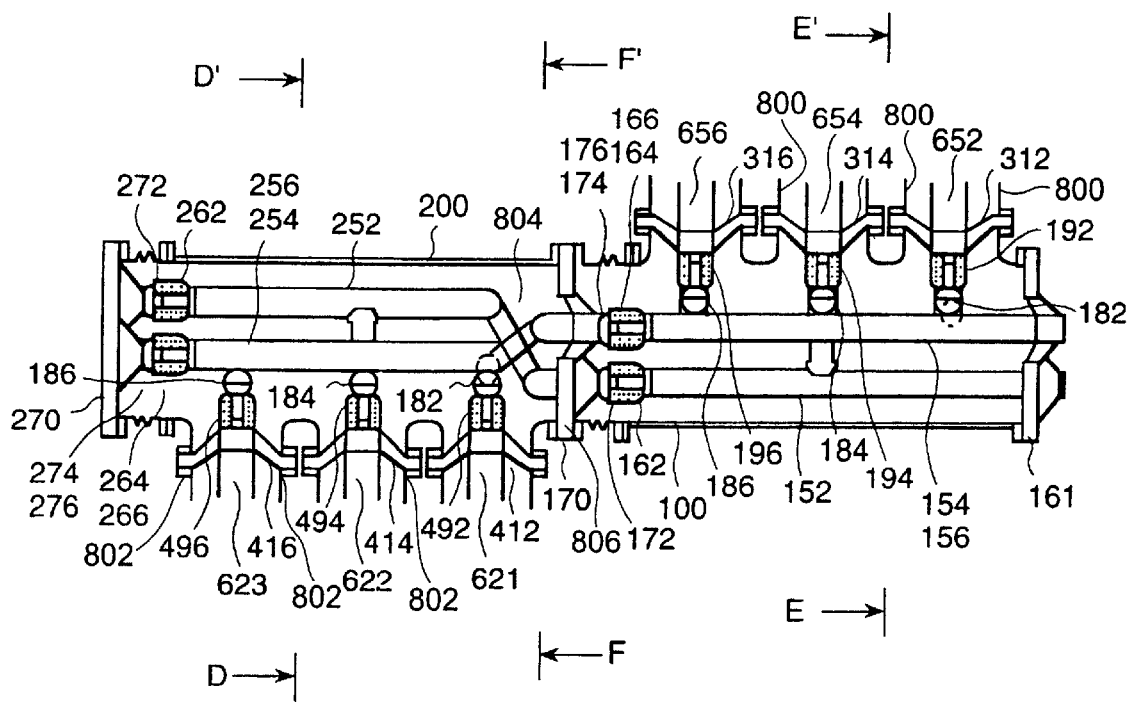
FIG. 4 is a cross sectional view of bus line conductor containers in the gas insulated switchgear device representing the embodiment of the present invention.

FIG. 4 is a cross sectional view take along line C–C' in FIG. 1 and shows a structure in which the main bus line containers 100 and 200 are connected in a straight line via an insulator spacer 170.

Within the grounded main bus line container 100, three phase main bus line conductors 152, 154 and 156 are accommodated inclusively together with SF6 gas. Further, one ends of the main bus line conductors 152, 154 and 156 are secured to an insulator spacer 161 and are electrically insulated each other which will be explained later, moreover, the main bus line conductors 152, 154 and 156 are arranged in the main bus line container 100 so as to assume apex positions of an equilateral triangle when cross sectioning the main bus line container 100.

The one ends of the main bus line conductors 152, 154 and 156 are secured to the insulator spacer 161 as explained above, however, the other ends thereof include expandable joints 162, 164 and 166 for every phase for permitting adjustment during assembly and are slidably supported by current collectors attached to the insulator spacer 170 where the adjacent main bus line conductors 252, 254 and 256 are secured. Further, as mentioned above, the main bus line conductors 152, 154 and 156 are arranged in the main bus line container 100 so as to assume apex positions of an equilateral triangle when cross sectioning the main bus line container 100, and one of the sides formed by connecting the apexes of the triangle is arranged in perpendicular to the horizontal direction.

The main bus line conductors 152, 154 and 156 are provided at the vertical triangle side connection ports 800 for every phase for connecting with the main bus line disconnecting switch unit in horizontal direction. These connection ports 800 are formed in perpendicular direction with respect to the installation plane and at respective connection ports expandable joints 182, 184 and 186 are provided in the direction bent by 90° from the direction of the respective main bus line conductors 152, 154 and 156 which are supported slidable in horizontal direction by current collectors 192, 194 and 196 attached to insulator spacers 312, 314 and 316 which secure connecting conductors 652, 654, 656 accommodated in the adjacent main bus line disconnecting switch unit. Thereby, the connecting conductors 652, 654 and 656 in the main bus line disconnecting switch units for every phase and the main bus line conductors 152, 154 and 156 are kept in an electrically connected state.

Figure 5:
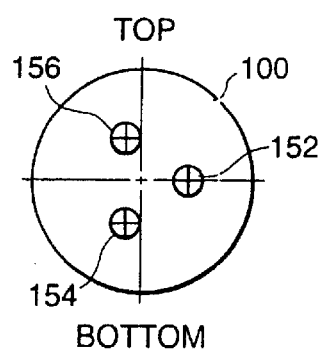
FIG. 5 is a cross sectional view of a bus line conductor container in the gas insulated switchgear device representing the embodiment of the present invention.

FIG. 5 shows a cross section taken along line E–E' in FIG. 4. Left side thereof is the side where the main bus line disconnecting switch unit is to be connected. The main bus line conductor 152 is arranged at a position remote from the main bus line disconnecting switch unit with reference to a vertical plane passing through the center axis of the main bus line container 100 and on a horizontal plane passing the center axis thereof. The main bus line conductor 154 is arranged below the horizontal plane passing the center axis thereof and at the side near to the main bus line disconnecting switch unit with reference to the vertical plane passing through the center axis thereof. Further, the main bus line conductor 156 is arranged above the main bus line conductor 154 so as to assume one of apex positions of a regular triangle formed by the main bus line conductors 152, 154 and 156 arranged inside the main bus line container 100 when cross sectioned thereof. The main bus line conductor 152 is connected to a connecting conductor 654 at the same height of the main bus line conductor 152 by making use of straight line shaped connecting conductor (not shown) via an expandable joint 184 and a current collector 194. Further, the main bus line conductor 156 is connected to a connecting conductor 652 at the same height as the main bus line conductor 152 by making use of a downwardly extending connecting conductor (not shown) via an expandable joint 182 and a current collector 192 and the main bus line conductor 154 is connected to a connecting conductor 656 at the same height as the main bus line conductor 152 by making use of an upwardly extending connecting conductor (not shown) via an expandable joint 186 and a current collector 196.

As has been explained above, since the main bus line conductors 152, 154 and 156 are arranged in the main bus line container 100 so as to assume apex positions of an equilateral triangle when cross sectioning the main bus line container 100, and one of the sides formed by connecting the apexes of the triangle is arranged in perpendicular to the horizontal direction, and the perpendicular side is arranged so as to face the connecting conductors 652, 654 and 656 in the main bus line disconnecting switch unit, thereby, a compact connection between the main bus line conductors 152, 154 and 156 and the connecting conductors 652, 654 and 656 can be realized without disturbing connection of other main bus line conductors.

Now, an embodiment with regard to main bus line container 200 will be explained.

Within the grounded main bus line container 200, three phase main bus line conductors 252, 254 and 256 are accommodated together with SF6 gas. Further, one ends of the main bus line conductors 252, 254 and 256 are secured to the insulator spacer 170 and are electrically insulated each other which will be explained later, moreover, the main bus line conductors 252, 254 and 256 are arranged in the main bus line container 200 so as to assume apex positions of an equilateral triangle when cross sectioning the main bus line container 200.

The one ends of the main bus line conductors 252, 254 and 256 are secured to the insulator spacer 170, however, the other ends thereof include expandable joints 262, 264 and 266 for every phase for permitting adjustment during assembly and are slidably supported by current collectors attached to an insulator spacer 270 where the adjacent main bus line conductors 352, 354 and 356 (not illustrated) are secured. Further, as mentioned above, the main bus line conductors 252, 254 and 256 are arranged in the main bus line container 200 so as to assume apex positions of an equilateral triangle when cross sectioning the main bus line container 200, and one of the sides formed by connecting the apexes of the triangle is arranged in perpendicular to the horizontal direction.

The main bus line conductors 252, 254 and 256 are provided with connection ports 802 for every phase for connecting with the main bus line disconnecting switch unit in horizontal direction at the vertical triangle side. These connection ports 802 are formed in perpendicular direction with respect to the installation plane and at respective connection ports expandable joints 282, 284 and 286 are provided in the direction bent by 90° from the direction of the respective main bus line conductors 252, 254 and 256 which are supported slidable in horizontal direction by current collectors 492, 494 and 496 attached to insulator spacers 412, 414 and 416 which secure connecting conductors 621, 622, 623 accommodated in the adjacent main bus line disconnecting switch unit. Thereby, the connecting conductors 621, 622 and 623 in the main bus line disconnecting switch units for every phase and the main bus line conductors 252, 254 and 256 are kept in an electrically connected state.

Figure 6:
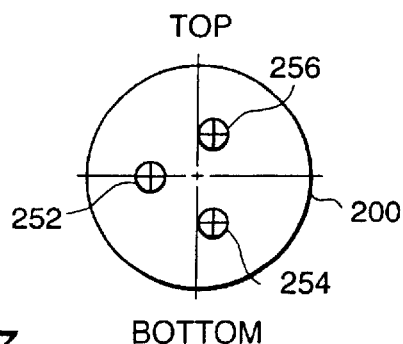
FIG. 6 is another cross sectional view of a bus line conductor container in the gas insulated switchgear device representing the embodiment of the present invention.

FIG. 6 shows a cross section taken along line D–D' in FIG. 4. Right side thereof is the side where the connecting conductors 621, 622 and 623 are to be connected. The main bus line conductor 252 is arranged at a position remote from the connecting conductors 621, 622 and 623 with reference to a vertical plane passing through the center axis of the main bus line container 200 and on a horizontal plane passing the center axis thereof. The main bus line conductor 254 is arranged below the horizontal plane passing the center axis thereof and at the side near to the connecting conductors 621, 622 and 623 with reference to the vertical plane passing through the center axis thereof. Further, the main bus line conductor 256 is arranged above the main bus line conductor 254 so as to assume one of apex positions of a regular triangle formed by the main bus line conductors 252, 254 and 256 arranged inside the main bus line container 200 when cross sectioned thereof. The main bus line conductor 252 is connected to a connecting conductor 622 at the same height of the main bus line conductor 252 by making use of straight line shaped connecting conductor (not shown) via an expandable joint 184 and a current collector 494. Further, the main bus line conductor 256 is connected to a connecting conductor 623 at the same height as the main bus line conductor 252 by making use of a downwardly extending connecting conductor (not shown) via an expandable joint 186 and a current collector 496 and the main bus line conductor 254 is connected to a connecting conductor 621 at the same height as the main bus line conductor 252 by making use of an upwardly extending connecting conductor (not shown) via an expandable joint 182 and a current collector 496.

As has been explained above, since the main bus line conductors 252, 254 and 256 are arranged in the main bus line container 200 so as to assume apex positions of an equilateral triangle when cross sectioning the main bus line container 200, and one of the sides formed by connecting the apexes of the triangle is arranged in perpendicular to the horizontal direction, and the perpendicular side is arranged so as to face the connecting conductors 621, 622 and 623 in the main bus line disconnecting switch unit, thereby, a compact connection between the main bus line conductors 252, 254 and 256 and the connecting conductors 621, 622 and 623 can be realized without disturbing connection of other main bus line conductors.

Figure 7:
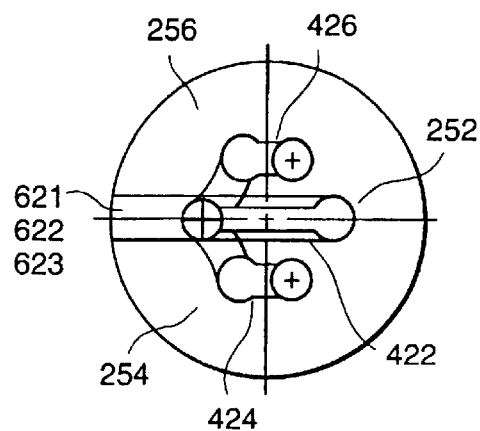
FIG. 7 is still another cross sectional view of a bus line conductor container in the gas insulated switchgear device representing the embodiment of the present invention.

FIG. 7 shows a cross sectional structure when seen toward the main bus line container 200 from the cross section F–F' in FIG. 4.

The bus line container 200 includes a phase transposing portions 422, 424 and 426 in which terminal portions 804 near the connecting portions 806 of the main bus line conductors 252, 254 and 256 extend to match the arrangement position of the main bus line conductors 152, 154 and 156 in the adjacent main bus line container 100 in such a manner that the perpendicular side of a triangularly arranged main bus line conductors 252, 254 and 256 in the main bus line container 200 comes and faces to the opposite side in the main bus line container 100, thereby, the connection ports 802 of the main bus line container 200 for the respective phases can be directed in 180° opposite direction from the connection ports 800 of the main bus line container 100 for the respective phases.

At the portion where the three phase bus line conductors cross each other, the diameter of the bus line conductors at the phase transposing portions 422, 424 and 426 is reduced in comparison with that of the main bus line conductors 252, 254 and 256 which are running in parallel with the main bus line container 200, thereby, sufficient electrical insulation distance between the three phase bus line conductors is ensured.

The insulator spacer 170 is provided with portions of expanding only toward the main bus line container 100, and the phase transposing portions 422, 424 and 426 are provided in the recessed sides in the insulator spacer 170, thereby, the insulation distance from the phase transposing portions 422, 424 and 426 to the nearest connecting conductor 621 is ensured.

Further, in the above embodiment, as the insulation gas SF6 gas was exemplified, however, through the use of other insulation gas than the SF6 gas the insulation performance of the device can be ensured. As has been explained hitherto, according to the gas insulated switchgear device of the present embodiment, the position of the triangular arrangement of the main bus line conductors in the main bus line container having a length corresponding to one bay is converted in a position of line symmetry with reference to a vertical plane passing through the center axis thereof, thereby, the direction of connection ports with a main bus line disconnecting switch units can be varied by 180° without providing a special main bus line phase transposing unit, a possible elongation of the entire length of the gas insulated switchgear device along the main bus line containers can, of course, be prevented and as much as possible compactness of the installation area thereof is realized.

Further, according to the gas insulated switchgear device of the present embodiment, in the bay interval in which a gas circuit breaker units for every three phases are provided, conversion of an arrangement position of the three phase bus conductors in the container can be realized, thereby, directions of the connection ports with bus line conductors in adjacent containers can be varied each other, thus gas circuit breaker units of which connecting conductors leading out direction from bus line conductors is different can be arranged with the adjacent bay interval, accordingly, an entire length of the gas insulated switchgear device can be reduced and further as much as possible compactness of the entire installation area thereof is realized.

According to the present invention as has been explained hitherto, even when the arrangement position of the three phase bus line conductors is varied, the entire length of the main bus line containers and the gas insulated switchgear device using the same never prolongs or the entire area thereof never enlarges beyond necessity, as well as compact main bus line containers which enhance insulation performance and operation reliability and a gas insulated switchgear device using the same can be provided.

What is claimed is:

1. A bus line container comprising a plurality of tanks connected generally in a straight line in which three phase main bus line conductors are accommodated and which includes connection ports through which connecting conductors to be connected with the bus line conductors are led out, wherein terminal portions near connecting portions for respective phases of the three phase bus line conductors in at least one of the tanks are extended so as to match an arrangement position of three phase bus line conductors in an adjacent tank, wherein corresponding phases of the three phase bus line conductors in said at least one of the tanks are positioned rotated 180° from corresponding three phase bus line conductors in an adjacent tank.

2. A bus line container of claim 1, wherein the three phase bus line conductors in the tank are arranged at apex positions of a triangle between the connection ports and the terminal portions in such a manner that one side of the triangle extends perpendicularly to the horizontal direction, and further the terminal portions near the connecting portions of the three phase bus line conductors are extended so that the perpendicular side with respect to the horizontal direction of the triangularly arranged three phase bus line conductors shifts to face the opposite side in the adjacent tank.

3. A bus line container of claim 1, wherein a diameter of a portion of the three phase bus line conductors which extends to the terminal portions near a connecting portion thereof is smaller than another portion of the three phase bus line conductors.

4. A bus line container of claim 1, wherein the tank is provided with a spacer which supports respective bus line conductors together with the adjacent tank and includes expanding portions toward the other tank, the direction of the expanding portions of the spacer is directed to the adjacent tank opposite to the side where the terminal portions near the connecting portions of the respective phases are located, and the terminal portions near the connecting portions for the respective phases extend between the spacer and the connection ports.

5. A bus line container formed by connecting a plurality of tanks in a generally straight line, each tank accommodating three phase main bus line conductors and the arrangement position of the respective phase bus line conductors is differentiated for every tank, wherein the bus line container comprising the three phase bus line conductors in the tank are arranged at apex positions of a triangle in such a manner that one side of the triangle extends perpendicularly to the horizontal direction, the bus line container further comprising:

a spacer which supports the three phase bus line conductors in the tank; and connection ports which are provided for the tank and through which connecting conductors to be connected to the three phase bus line conductors for respective phases are led out; and wherein terminal portions near connecting portions for corresponding phases of the three phase bus line conductors in at least one of the tanks are positioned rotated 180° from corresponding three phase bus line conductors in an adjacent tank.

6. A bus line container formed by connecting a plurality of tanks in a generally straight line, each tank accommodating three phase main bus line conductors and the arrangement position of the respective phase bus line conductors is differentiated for every tank, wherein the bus line container comprising first three phase bus line conductors in the tank are arranged at apex positions of a triangle in such a manner that one side of the triangle extends perpendicularly to the horizontal direction the bus line container further comprising:

a first spacer which supports the first three phase bus line conductors in the tank;

second three phase bus line conductors in the tank are arranged at apex positions of a triangle in such a manner that one side of the triangle extends perpendicularly to the horizontal direction;

a second spacer which supports the second three phase bus line conductors in the tank; and connection ports which are provided for the respective tanks at the perpendicularly extending side of the respective triangles and through which connecting conductors to be connected to the three phase bus line conductors for respective phases are led out; and wherein terminal portions near connecting portions for corresponding phases of the three phase bus line conductors in at least one of the tanks are positioned rotated 180° from corresponding three phase bus line conductors in an adjacent tank.

7. A bus line container of claim 5, wherein the three phase bus line conductors in the tank are arranged at apex positions of a triangle between the connection ports and the terminal portions in such a manner that one side of the triangle extends perpendicularly to the horizontal direction, and further the terminal portions near the connecting portions of the three phase bus line conductors are extended so that the perpendicular side with respect to the horizontal direction of the triangularly arranged three phase bus line conductors shifts to face the opposite side in the adjacent tank.

8. A bus line container of claim 5, wherein a diameter of a portion of the three phase bus line conductors which extends to the terminal portion near a connecting portion thereof is smaller than another portion of the three phase bus line conductors.

9. A bus line container of claim 5, wherein the tank is provided with a spacer which supports respective bus line conductors together with the adjacent tank and includes expanding portions toward the other tank, the direction of the expanding portions of the spacer is directed to the adjacent tank opposite to the side where the terminal portions near the connecting portions of the respective phases are located, and the terminal portions near the connecting portions for the respective phases extend between the spacer and the connection ports.

10. A bus line container formed a plurality of tanks connected in a generally straight line in which three phase main bus line conductors are accommodated and which includes connection ports through which connecting conductors to be connected with the bus line conductors are led out, wherein terminal portions near connecting portions for corresponding phases of the three phase bus line conductors in at least one of the tanks are positioned rotated 180° from corresponding three phase bus line conductors in an adjacent tank.

11. A gas insulated switchgear device comprising first and second bus line containers in which three phase main bus line conductors are accommodated, each of the first and second bus line containers is provided with three connection ports through which connecting conductors to be connected to respective phase bus line conductors are led out and circuit breakers which are connected to the respective connecting conductors, wherein the first and second containers are connected in a straight line shape, the respective three connection ports through which the connecting conductors of the respective first and second containers are led out are provided in such a manner that both sets of three connection ports are directed toward a horizontal direction with respect to the axial direction of the first and second containers but face opposite sides relative to each other, and the connecting conductors led out through the connection ports from the same side in horizontal direction are turned immediately downward at the midway thereof and are electrically connected to the respective circuit breakers, wherein corresponding phases of the three phase main bus line conductors in said first bus line container are positioned rotated 180° from corresponding three phase main bus line conductors in said second bus line container.

12. A gas insulated switchgear device comprising first and second bus line containers in which three phase main bus line conductors are accommodated, each of the first and second bus line containers is provided with three connection ports through which connecting conductors to be connected to respective phase bus line conductors are led out and circuit breakers which are connected to the respective connecting conductors, wherein the first and second containers are connected in a generally straight line, the respective three connection ports through which the connecting conductors of the respective first and second containers are led out are provided in such a mariner that both sets of three connection ports are directed toward a horizontal direction with respect to the axial direction of the first and second containers but face opposite sides relative to each other, and the connecting conductors led out through the connection ports from the same side in horizontal direction are turned immediately downward at the midway thereof and are electrically connected to the respective circuit breakers and at each of the routes from the connection ports to the circuit breakers a disconnecting switch and a grounding switch are respectively provided, wherein corresponding phases of the three phase main bus line conductors in said first bus line container are positioned rotated 180° from corresponding three phase main bus line conductors in said second bus line container.

13. A gas insulated switchgear device comprising first and second bus line containers in which three phase main bus line conductors are accommodated, each of the first and second bus line containers is provided with three connection ports through which connecting conductors to be connected to respective phase bus line conductors are led out and circuit breakers which are connected to the respective connecting conductors, wherein the circuit breakers arranged for respective phases are of a lateral type, the first and second containers are connected in a generally straight line, the respective three connection ports through which the connecting conductors of the respective first and second containers are led out are provided in such a maimer that both sets of three connection ports are directed toward a horizontal direction with respect to the axial direction of the first and second containers but face opposite sides relative to each other, and the connecting conductors led out through the connection ports from the same side in horizontal direction are turned immediately downward at the midway thereof and are electrically connected to the respective circuit breakers and at each of the routes from the connection ports to the circuit breakers a disconnecting switch and a grounding switch are respectively provided, wherein corresponding phases of the three phase main bus line conductors in said first bus line container are positioned rotated 180° from corresponding three phase main bus line conductors in said second bus line container.

14. A gas insulated switchgear device including first and second bus line containers connected in an adjacent manner each container accommodating three phase main bus line conductors, the first bus line container includes first connection ports through which connecting conductors to be connected to the main bus line conductors are led out therein and the second bus line container includes second connection ports through which connecting conductors to be connected to the main bus line conductors are led out, wherein an arrangement position of the respective phase bus line conductors in the first and second bus line containers are transposed in the way from the connection ports to the other bus line container to be connected, and the connection ports for the first and second bus line containers are formed so as to directed in opposite directions, wherein corresponding phases of the three phase main bus line conductors in said first bus line container are positioned rotated 180° from corresponding three phase main bus line conductors in said second bus line container.

* * * * *